Patented July 15, 1947

2,423,823

UNITED STATES PATENT OFFICE 2,423,823

CELLULOSE ESTER-POLYESTER COMPOSITIONS AND METHODS OF PREPARING THEM

William O. Baker, Morristown, N. J., assignor to Bell Telephone Laboratories, Incorporated, New York, N. Y., a corporation of New York No Drawing. Application June 26, 1943, Serial No. 492,451

12 Claims. (Cl. 260—16)

1

This invention relates to compositions of matter comprising a cellulose ester and another polymeric material, and to processes of producing such compositions of matter. More particularly the invention relates to compositions of matter comprising a cellulose acetate-butyrate and a high molecular weight linear polyester and possessing numerous advantageous properties, and to processes of producing such compositions of matter.

Cellulose esters, including cellulose acetate-butyrate, in general are brittle and possess other disadvantageous characteristics impairing their technical usefulness. To reduce such brittleness and to minimize the effects of other disadvantageous characteristics sufficiently to render such cellulose esters useful it has been found necessary to incorporate into the cellulose esters other substances, which are usually termed plasticizers. Several characteristics, among others, are required of a plasticizer for a cellulose ester: for example, the plasticizer must be compatible with the cellulose ester in quantities sufficient to provide the desired improvement in characteristics; it must produce the desired improvement in characteristics without undue softening of the cellulose ester; it must be retained in the mass of cellulose ester throughout a reasonable period of use under normal conditions of use; it should not harmfully affect the color of the cellulose ester; and it must not induce acidity in the composition.

The most important requirement is that the plasticizer be compatible with the cellulose ester; e. g., that the plasticizer be capable of being thoroughly mixed with and of remaining mixed with the cellulose ester. If the plasticizer is not compatible with the cellulose ester, it will in time separate from the cellulose ester so that the body formed of the ester becomes brittle and weak.

The plasticizing action of a plasticizer probably arises through dissipation of stresses rapidly applied to the cellulose ester through a band of relaxation times introduced by the coupled interaction of the molecules of the plasticizer with the macro-molecules of the cellulose ester. This interaction to be effective must apparently occur at molecular distances on the order of 5 to 10 angstroms; incompatible substances added to cellulose esters have molecular configurations which do not permit such coupled molecular interaction at such distances and hence usually further weaken the cellulose esters.

It has heretofore been the usual practice to employ low molecular weight plasticizers, such as alkyl phthalates, since such plasticizers in general have been the only ones found to have molecular configurations permitting sufficient compatibility and molecular interaction required of useful plasticizers.

In general, such low molecular weight plasticizers possess several disadvantages. Because of their low molecular weight they tend to evaporate or diffuse from the cellulose esters during use, particularly at elevated temperatures to which the cellulose esters may be subjected during use. Furthermore such low molecular weight plasticizers also tend to be removed from the cellulose esters due to leaching by water or other liquids to which the plasticized cellulose esters may be subjected in use. Loss of plasticizer for these reasons results in increased brittleness, lowered impact resistance of the cellulose ester, and other disadvantages impairing usefulness.

The low molecular weight plasticizers also often cause undue lowering of tensile strength and softening when they are incorporated into cellulose esters because they do not present sufficient continuity of high intra-molecular forces to resist fracture.

These difficulties are eliminated and other advantages are provided by the products and the processes of the present invention.

The present invention provides a composition of matter comprising at least one cellulose acetate-butyrate which contains not less than about 2 per cent by weight of butyryl, not less than about 2 per cent and not more than about 22 per cent by weight of acetyl, and between about 0.2 and about 0.5 mol of hydroxyl per theoretical glucose unit of the cellulose acetate-butyrate, which has homogeneously incorporated and thoroughly mixed therewith between about 1 and about 25 percent of at least one high molecular weight linear polyester of the kind indicated hereinafter.

Surprisingly, despite the fact that the polyester has large molecules of chain structures radically different from those of the cellulose ester, a high degree of interaction occurs between the molecules of the polyester and those of the cellulose acetate-butyrate. For this reason the polyester is extremely compatible in the proportions contemplated by the invention with the type of cellulose acetate-butyrate employed in the present invention and greatly reduces the brittleness without undue softening of the cellulose ester, increases the tensile strength and toughness, increases impact resistance, increases the abrasion resistance, increases water resistance, and otherwise improves the properties of the cellulose ester.

Furthermore, the polyester does not change the color of the cellulose ester and does not induce acidity therein, since it is substantially as stable as the cellulose ester. Moreover, the polyester is permanently retained in the cellulose ester and does not diffuse, evaporate, or leach out as do low molecular weight plasticizers; this apparently is because of the high molecular weight of the polyester. These and other advantages of the invention will be more fully apparent from the following discussion.

Cellulose acetate-butyrate containing not less than about 21 per cent by weight of butyryl, not less than about 2 per cent and not more than about 22 per cent by weight of acetyl, and between about 0.2 and about 0.5 mol of hydroxyl per theoretical glucose unit of the cellulose acetate-butyrate are commercially available or may be readily made by well-known techniques. The butyryl, acetyl, and hydroxyl contents of a given sample of cellulose acetate-butyrate may be determined by methods known to the art and require no further description.

It has been found that the above indicated proportions of butyryl, acetyl, and hydroxyl in the acetate-butyrate are of critical importance in making possible the high degree and permanence of compatibility of the linear polyester with the cellulose ester, and the other advantageous properties characteristic of the composition of matter of the present invention. It appears that other cellulose esters or cellulose acetate-butyrates having proportions of butyryl, acetyl, and hydroxyl outside of the ranges indicated above are poorly compatible with linear polyesters in any proportions.

The polyesters employed according to the present invention are linear polyesters in the sense that their molecules are essentially linear long chains; although there may be some branching of said molecules or cross-linking therebetween introduced during the esterification process, the polyesters are nevertheless fusible and soluble at least prior to being incorporated with cellulose acetate-butyrates to form the compositions of the present invention.

The essentially linear molecules of the polyesters employed in the present invention essentially consist of divalent organic radicals connected together by ester linkages. The divalent radicals are usually hydrocarbon radicals, but may contain other groups such as heteroatoms, ether linkages, sulphur linkages, acetal linkages, ketone groups or various other structures either in the linear molecular chains or in substituted side chains. Most commonly, however, these divalent radicals are aliphatic chains. Advantageously all of the linkages connecting together said divalent radicals are carboxylic ester linkages; however, minor proportions of other linkages, such as amide linkages, may connect together the organic radicals in the molecular chains.

The linear polyesters may be produced according to the processes described in United States Patents Nos. 2,071,250 and 2,249,950. They may be prepared by super-esterification of a suitable glycol with a suitable dicarboxylic acid, or of a suitable monohydroxy monocarboxylic acid with itself, or of a suitable mixture of a glycol, a dicarboxylic acid and such a hydroxy acid, or of ester-forming derivatives of such bifunctional reactants. Such super-esterification may be conducted in various manners, as by heating such bifunctional reactants to temperatures above their melting points under conditions such as to remove effectively and continuously the reaction by-products. Such reaction by-products may be effectively removed by bubbling an inert gas such as dry oxygen-free hydrogen or nitrogen through the reaction mixture until esterification or condensation has proceeded to the desired degree of completion, with or without the application of reduced pressure.

While some beneficial improvement of the properties of the cellulose acetate-butyrate may be achieved if a linear polyester having a relatively low molecular weight is incorporated with the cellulose ester, best results from the standpoint of permanent improvement in properties are provided when the polyester has a molecular weight of at least about 5000 as determined by the Staudinger viscosity method, corresponding to an intrinsic viscosity of at least about 0.3 of a solution of about 0.4 gram of the polyester in 100 cubic centimeters of chloroform. Linear polyesters will possess the above indicated molecular weights if they contain an average of at least about 500 atoms in their molecular chains, or if they contain at least 98 ester groups for each 100 total ester, hydroxyl and carboxyl groups in the polyester (98 per cent of theoretically complete esterification).

An amount of polyester between about 1 and about 25 per cent by weight of the cellulose acetate-butyrate is employed since a proportion of polyester greater than 25 per cent is in general incompatible and since proportions less than about 1 per cent produce a negligible beneficial effect on the cellulose ester.

The polyesters may have various physical characteristics. They may be highly crystalline solids at ordinary temperatures, or they may be essentially non-crystalline amorphous solids at ordinary temperatures, they may be liquids at ordinary temperatures, or they may have intermediate characteristics.

These characteristics are determined by the molecular configuration of the polyester, which in turn is dependent upon the nature of the bifunctional reactants from which the polyester is formed. Thus, polyesters formed by esterification of polymethylene glycols with polymethylene dicarboxylic acids, or by the esterification of polymethylene monohydroxy monocarboxylic acids are in general highly crystalline. As the molecular structure departs from this saturated straight aliphatic chain arrangement, as for instance because of the presence of side chains, heteroatoms, or unsaturated carbon-to-carbon bonds, the polyesters become less crystalline. Aromatic rings in the molecular chains or a relatively high degree of disorder of similar groups in the molecular chains in general tend to reduce the crystallinity of the linear polyester. The length of the molecular chains in some cases also affects the crystallinity.

The nature of the polyester which is incorporated into the cellulose acetate-butyrate will to a large extent determine the characteristics of the final composition. In general the compositions containing the polyesters which are highly crystalline solids at room temperatures will be harder than compositions containing polyesters which are amorphous solids or liquids at room temperatures.

The compositions including the polyester may be made to have strength, toughness, flexibility and other characteristics sufficient for a wide variety of uses. The polyester content of the compositions makes possible these advantageous characteristics as well as those indicated above.

The polyester may be incorporated into the cellulose acetate-butyrate in various manners. For example, the cellulose acetate-butyrate and the polyester may be thoroughly mixed together while they are at elevated temperatures which cause them to be in the fluid state: e. g., renders them plastic or liquid. Alternatively, the cellulose acetate-butyrate and polyester may be mixed together at room or elevated temperatures while they are dissolved in suitable solvents; the cellulose acetate-butyrate may be dissolved in one solvent while the polyester may be dissolved in another solvent and the two solutions mixed together, or both the cellulose ester and polyester may be dissolved in a common solvent. As another example, the cellulose acetate-butyrate in finely divided form and the solid polyester in finely divided form and in the proper proportion may be mixed to form a molding powder which is molded at an elevated temperature which melts the cellulose ester and polyester and cause them to intermix.

The present invention also contemplates the provision and formation of a composition comprising a cellulose acetate-butyrate of the kind indicated above, having homogeneously incorporated therein a polyester of the kind and in the proportions indicated above in which composition the linear molecules of the polyester and probably of the cellulose ester are cross-linked so that the composition of cellulose acetate-butyrate and polyester may be infusible and insoluble. Such cross-linking may be accomplished in accordance with the disclosures of copending applications Serial No. 401,952, filed July 11, 1941, and Serial No. 485,202, filed April 30, 1943, by C. S. Fuller.

According to this phase of the invention, the polyester either prior to, during, or after mixing with the cellulose acetate-butyrate is exposed to and preferably has intimately mixed therewith a free-radical generating agent which is capable of causing cross-linking between the linear molecules of the polyester. Advantageously the mixture of the cellulose acetate-butyrate and the polyester, containing the free-radical generating agent, is heated to a temperature sufficient to decompose the free-radical generating agent since this speeds the action; however, in some cases the cross-linking will occur upon mere ageing at ordinary temperatures.

The polyester which is thus cross-linked by a free-radical generating substance is of the type described hereinbefore; it may be essentially crystalline, essentially amorphous, or of an intermediate state; it may be saturated or substantially wholly free of non-benzenoid unsaturation, or it may contain an appreciable amount of non-benzenoid or olefinic unsaturation.

If the polyester is substantially saturated it advantageously should contain on the average of at least one ester group for each 20 atoms in the linear molecular chains, or more advantageously on the average of at least one ester group for each 7 atoms in the linear molecular chains.

If the polyester contains non-benzenoid unsaturation, it is advantageous if the polyester contains on the average not more than about five unsaturated bonds per 400 atoms in the linear molecular chains in the polyester, and preferably less than about two such bonds per 400 atoms in such chains. A greater degree of unsaturation in general is undesirable since it causes too great an amount of cross-linking which might impede compatibility with the cellulose ester, and since it renders it difficult to produce linear polyesters having the desired molecular weights of 5000. Such unsaturated polyesters may be made by including in the polyester-forming reactants at least one unsaturated bifunctional reactant, such as a dicarboxylic acid, glycol or hydroxy acid having non-benzenoid unsaturation in the organic radical between its functional groups. Thus, a portion of a saturated dicarboxylic acid in a polyester-forming mixture may be replaced by an unsaturated acid such as maleic, itaconic, mesaconic, muconic or dihydromuconic acid, and the mixture then reacted to form a suitable unsaturated polyester.

The free-radical generating agent is one which upon decomposition generates free radicals having a hydrogen deficiency, because of their hydrogen deficiency these radicals remove the active hydrogen atoms on the carbon atoms adjacent the ester groups of the linear molecules of at least the saturated polyesters and cause cross-linking between these carbon atoms at the resulting free valences; and these free radicals also cause cross-linking at the unsaturated bonds of unsaturated polyesters. It appears also that the free radicals of the free-radical generating agent cause cross-linking between the linear molecules of the polyester and the linear molecules of the cellulose acetate-butyrate, and possibly between the linear molecules of the cellulose acetate-butyrate itself. In general, the most effective free-radical generating agents are the organic peroxides, such as benzoyl peroxide, acyl peroxides such as lauryl peroxide, ether peroxides, ketone peroxides, olefin peroxides, terpine peroxides (particularly ascaridole), peracids and hydrocarbon peroxides. Other free-radical generating agents, such as phenylazide or certain other azides when used in sufficient quantities, also provide a useful cross-linking action. Benzoyl peroxide appears to be about the most effective cross-linking agent.

Advantageously, an intimate mixture of the cellulose acetate-butyrate and the polyester, containing the free-radical generating agent is heated to a temperature above the decomposition temperature of said agent, in general to a temperature on the order of about 125° C. The curing or cross-linking action is practically instantaneous, so that the heating operation need not be continued substantially longer than the time necessary for the interior of the article to reach the curing temperature.

The amount of a free-radical generating agent which should be employed varies with the amount of the polyester employed, the nature of the free radical generating agent, and with the nature and molecular structure of the polyester. In general, more free-radical generating substance must be employed for a saturated polyester than for an unsaturated polyester. In general about 10 per cent or less of the free-radical generating agent by weight of the polyester may be employed.

The free radical generating agent may be incorporated in various manners. Thus, the free-radical generating agent may be incorporated as a finely divided solid or in the form of a solution. It may be intimately mixed with the polyester itself, or with the mixture of the polyester and the cellulose acetate-butyrate, as by milling; however, the temperature at which the mixing takes place should be less than the decomposition temperature of the free-radical generating agent so that appreciable cross-linking cannot occur until complete mixing has taken place, after which the mixture may be heated to cure the composition of matter by causing the desired cross-linking. As another alternative, the polyester may be mixed with the free-radical generating agent in the form of a solid or a solution while the polyester is in solution either alone or with the proper proportion of the cellulose acetate-butyrate. As another alternative, a molding powder of finely divided acetate-butyrate, finely divided polyester and finely divided solid free-radical generating agent may be employed in the usual molding procedures; the elevated molding temperatures render plastic and cause intermixing of the cellulose acetate-butyrate and polyester, and also cause decomposition and the cross-linking action of the free-radical generating agent. Other methods of treating the cellulose acetate-butyrate and polyester composition with a free-radical generating agent may be employed.

The compositions of the present invention which have been cross-linked have advantageous properties similar to those discussed above. The effect of the cross-linking in general is to increase the tensile strength, flexibility, toughness, resistance to abrasion, and water resistance of the cellulose acetate-butyrate polyester composition. The cross-linking does not impair the compatibility of the cellulose acetate-butyrate; indeed, the permanence of the compatibility of the polyester with the cellulose acetate-butyrate is increased due to the cross-linking between the linear molecules of the polyester and those of the cellulose acetate-butyrate. Characteristics such as flexibility and hardness are largely dependent upon the nature of the polyester. If the polyester was originally essentially amorphous, and particularly if a liquid, cross-linking to the degree indicated above will tend to make the polyester rubber-like in nature and impart some of such characteristic to the composition containing the polyester and cellulose acetate-butyrate. If the polyester is essentially crystalline in nature, the cross-linking tends to increase its hardness and thus tends to increase the hardness of the composition comprising a cellulose acetate-butyrate and the polyester. The cross-linking also tends to decrease the fusibility and solubility of the composition of the cellulose acetate-butyrate and the polyester, regardless of the nature of the polyester employed.

Because of the decrease in fusibility and solubility on cross-linking, it is desirable, if not necessary, that the composition comprising the cellulose acetate-butyrate and the polyester be formed into its final shape as by molding, casting, extrusion, etc., before the cross-linking occurs, e. g., before the composition is heated to cause the cross-linking.

The following specific examples will illustrate the manner in which the present invention may be practiced:

*Example 1.*—A small amount of cellulose acetate-butyrate flake containing 36.7 per cent butyryl, 13 per cent acetyl and about 0.4 mol of hydroxyl per theoretical glucose unit was mixed with 20 per cent of polyethylene sebacate by weight of the cellulose acetate-butyrate, having a molecular weight as determined by the Staudinger viscosity method of about 20,000. The mixture was thoroughly hot-mixed at 200° C. The resulting fluid melt was cast into disks which were cooled. The fact that each cooled disk was glass-clear and the fact that examination in polarized light showed an isotropic state indicated complete compatibility. The disks were tough and flexible and the material of which they were formed was found to be especially suitable for molding purposes. A disk of this composition was placed in distilled water at 60 degrees and another disk of the same composition was kept in air at this temperature for 107 days. At the end of this time the air sample was still clear and homogeneous; there was no indication of any separation of phases. The disk was tough, had excellent heat stability, and was unchanged in other physical respects. Likewise, the specimen kept in water remained clear and retained its strength and flexibility after 107 days immersion. No cheesiness or tendency toward crumbling developed; this was quite different from the water-induced changes produced on long immersion of the linear polyesters themselves or of cellulose acetate-butyrate plasticized with ordinary low molecular weight plasticizers.

*Example 2.*—Another composition of matter was prepared in a manner similar to that described in Example 1 by hot-compounding the same cellulose acetate-butyrate and about 11 per cent by weight of the polyethylene sebacate of Example 1. The resulting composition again was hard, tough, and displayed complete compatibility.

*Example 3.*—A mixture of the cellulose acetate-butyrate flake of Example 1 and 25 per cent by weight of polyethylene succinate having a molecular weight of about 15,000 as determined by the Staudinger viscosity method was hot-mixed at 210° C. The cooled product displayed complete compatibility and was tough and flexible. Thin sections were cold-drawn successfully. The cellulose acetate-butyrate polyester composition thus prepared was melted and it was found that strong fibers could be easily drawn from the melt.

*Example 4.*—A solution in acetone containing 10 per cent by weight of the cellulose acetate-butyrate flake of Example 1 and a solution in chloroform containing 10 per cent by weight of the polyethylene sebacate of Example 1 were mixed in such proportions as to produce a mixture of cellulose acetate-butyrate and the polyester containing the 20 per cent of the polyester by weight of the cellulose acetate-butyrate. A film was cast from this mixture of solutions and dried at room temperature. After drying, the film was found to be tough and flexible and to show no signs of incompatibility of the cellulose acetate-butyrate and the polyester.

*Example 5.*—A mixture of 9 grams of cellulose acetate-butyrate (36.7 per cent butyrl, 13 per cent acetyl, 0.4 mol of hydroxyl per glucose unit, and 1 gram of polyethylene sebacate-maleate containing 2 mol per cent of maleic acid residues and having a molecular weight of over 5,000 as determined by the Staudinger method was hot compounded at 200° C., cast into a sheet and cooled. A solution of 0.25 gram of benzoyl peroxide in 5 cubic centimeters of toluene was contacted with the sheet and allowed to diffuse therein. The toluene was evaporated and the resulting sheet was briefly heated at 175° C. The finished sheet was tough, flexible, insoluble and infusible. Apparently the peroxide caused coreaction between the cellulose ester and polyester, since they could not be separated by selective solvent treatment, as by treatment with acetone.

*Example 6.*—10 grams of the cellulose acetate-butyrate flake of Example 1 and 2.5 grams of polyethylene succinate having a molecular weight of over 5,000 as determined by the Staudinger method were dissolved in 100 cubic centimeters of chloroform, after which 0.2 gram of benzoyl peroxide was added to the solution. After stirring, the resulting solution was cast into a clear film from which the chloroform was evaporated. The film was briefly heated at about 125° C., after which it was found to be infusible, solvent resistant, tough and tear resistant.

*Example 7.*—10 grams of the cellulose acetate-butyrate flake of Example 1 and 2.5 grams of polyethylene succinate-maleate containing 5 mol per cent of maleic acid residues and having a molecular weight substantially over 5,000 as determined by the Staudinger method were thoroughly mixed together while in a plastic condition at about 200° C. Then 0.3 gram of finely divided benzoyl peroxide was quickly kneaded into the mass, which rapidly set into a tough, infusible gel.

Cellulose acetate of the range of butyryl, acetyl and hydroxyl contents indicated above was also successfully compounded with other high molecular weight linear polyesters such as the ethylene polyesters of succinic, glutaric, adipic, pimelic, suberic, azelaic, sebacic and higher homologous dicarboxylic acids. Proportions of maleic, itaconic, dihydromuconic and other unsaturated acids were also coreacted with such reactants to form unsaturated polyesters, which were mixed with cellulose acetate-butyrate and subsequently cross-linked with benzoyl peroxide.

The above examples are purely illustrative and various other kinds of linear polyesters than those indicated above may be employed in the proportions indicated above with the types of cellulose acetate-butyrate contemplated by the present invention.

If desired, the compositions of the present invention may also have incorporated therein other substances such as softeners, plasticizers, pigments, other synthetic resins such as other linear polymers, methacrylate or acrylate or other vinyl resins, etc. In general, however, such other substances should be employed in minor proportions.

The compositions of the present invention may be employed for molding purposes, extrusion or casting into sheets or other articles, impregnation of fabrics or other materials, as coatings, as adhesives for laminated glass or for other adhesive purposes, as electrical insulation either in the form of articles of substantial cross-sectional thicknesses or in the form of fabrics, tapes, or coatings on conductors, and for other purposes for which plasticized cellulose ester compositions may be employed. Modifications in the compositions, processes and uses of the compositions of the present invention other than those indicated above are included within the scope of the present invention.

It is intended that the patent shall cover by suitable expression in the appended claims whatever features of patentable novelty reside in the invention.

What is claimed is:

1. A composition of matter comprising an intimate homogeneous mixture of cellulose acetate-butyrate material containing by weight not less than about 21 per cent of butyryl, not less than about 2 per cent and not more than about 22 per cent of acetyl and between about 0.2 and 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials selected from the class consisting of (a) polymerizable monohydroxy monocarboxylic acids and (b) mixtures of glycols and dicarboxylic acids, said polyester possessing an average molecular weight of at least about 5,000 as determined by the Staudinger viscosity method.

2. The composition of matter of claim 1 in which said synthetic linear polyester material is essentially crystalline.

3. The composition of matter of claim 1 in which said synthetic linear polyester material is essentially amorphous.

4. A composition of matter comprising a product obtained by heating with an organic peroxide an intimate mixture of cellulose acetate-butyrate material containing by weight not less than about 21 per cent of butyryl, not less than about 2 per cent and not more than about 22 per cent of acetyl and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials selected from the class consisting of (a) polymerizable monohydroxy monocarboxylic acids and (b) mixtures of glycols and dicarboxylic acids, said polyester possessing an average molecular weight of at least about 5,000 as determined by the Staudinger viscosity method.

5. The composition of matter of claim 4 in which said organic perioxide is benzoyl peroxide.

6. A composition of matter comprising a product obtained by heating with benzoyl peroxide an intimate mixture of cellulose acetate-butyrate material containing by weight not less than about 21 per cent of butyryl, not less than about 2 per cent and not more than about 22 per cent of acetyl and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition comprising a glycol and a dicarboxylic acid and no ingredient which is not a glycol or a dicarboxylic acid, said mixture being free of non-benzenoid unsaturation, said polyester possessing an average molecular weight of at least about 5000 as determined by the Staudinger viscosity method.

7. A composition of matter comprising a product obtained by heating with benzoyl peroxide an intimate mixture of cellulose acetate-butyrate material containing by weight not less than about 21 per cent of butyryl, not less than about 2 per cent and not more than about 22 per cent of acetyl and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials, containing olefinic unsaturation, comprising a glycol and a dicarboxylic acid and no ingredient which is not a glycol or a dicarboxylic acid, said polyester possessing an average molecular weight of at least about 5000 as determined by the Staudinger viscosity method.

8. The method of producing a composition of matter of improved properties comprising intimately mixing while in the fluid state cellulose acetate-butyrate material containing by weight not less than about 21 per cent of butyryl, not less than about 2 per cent and not more than about 22 per cent of acetyl, and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials selected from the class consisting of (a) polymerizable monohydroxy monocarboxylic acids and (b) mixtures of glycols and dicarboxylic acids, said polyester possessing an average molecular weight of at least about 5,000 as determined by the Staudinger viscosity method.

9. The method of producing a composition of matter of improved properties comprising heating with an organic peroxide an intimate mixture of cellulose acetate-butyrate material containing by weight not less than about 21 per cent of butyryl, not less than about 2 per cent and not more than about 22 per cent of acetyl and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials selected from the class consisting of (a) polymerizable monohydroxy monocarboxylic acids and (b) mixtures of glycols and dicarboxylic acids, said polyester possessing an average molecular weight of at least about 5,000 as determined by the Staudinger viscosity method.

10. The method of claim 9 in which said organic peroxide is benzoyl peroxide.

11. The method of producing a composition of matter of improved properties comprising intimately mixing with an organic peroxide cellulose acetate-butyrate material containing by weight not less than about 21 per cent of butyryl, not less than about 2 per cent and not more than about 22 per cent of acetyl and between about 0.2 and about 0.5 mol of hydroxyl per glucose unit; and between about 1 and about 25 per cent by weight of the cellulose acetate-butyrate material of synthetic linear polyester material produced by condensation polymerization reaction of a polymer-forming composition consisting of reacting materials free of non-benzenoid unsaturation comprising a glycol and a dicarboxylic acid and no ingredient other than a glycol and a dicarboxylic acid, said polyester possessing an average molecular weight of at least about 5,000 as determined by the Staudinger viscosity method, and heating said mixture of said cellulose acetate-butyrate materials, synthetic linear polyester material and organic peroxide to a temperature sufficient to cause cross-linking.

12. The method of producing a composition of matter of improved properties comprising intimately mixing with an organic peroxide cellulose acetate-butyrate material containing by weight not less than about 21 per cent of butyryl, not less than about 2 per cent and not more than about 22 per cent of acetyl, and between about 0.2 and about 0.5 mols of hydroxyl per glucose unit; and between about 1 and about 25 per cent by weight of the cellulose acetate-butyrate material of synthetic linear polyester material produced by condensation polymerization reaction of a polymer-forming composition consisting of reacting materials, containing olefinic unsaturation, comprising a glycol and a dicarboxylic acid and no ingredient other than a glycol or a dicarboxylic acid, said polyester possessing an average molecular weight of at least about 5,000 as determined by the Staudinger viscosity method, and heating said mixture of said cellulose acetate-butyrate material, synthetic linear polyester material and organic peroxide to a temperature sufficient to cause cross-linking.

WILLIAM O. BAKER.

REFERENCES CITED

The following references are of record in the file of this patent:

UNITED STATES PATENTS

| Number | Name | Date |
| --- | --- | --- |
| 2,155,590 | Garvey | Apr. 25, 1939 |
| 2,195,362 | Ellis | Mar. 26, 1940 |
| 1,946,205 | Gabriel | Feb. 6, 1934 |
| 2,137,995 | Whipple | Nov. 22, 1938 |
| 2,071,250 | Carothers | Feb. 16, 1937 |
| 2,224,037 | Brubaker et al. | Dec. 3, 1940 |

OTHER REFERENCES

Biggs and Fuller, "Paracon," pages 962 and 963, June 25, 1943.

Chemical & Engineering News, vol. 21, No. 12.

Gloor, pages 690–696, Ind. and Eng. Chem., June 1937.

Fordyce et al., pp. 1310–1313, Ind. and Eng. Chem., Nov. 1936.